United States Patent
Kiewicz et al.

[15] 3,670,421
[45] June 20, 1972

[54] GAGING DEVICE

[72] Inventors: Frank M. Kiewicz, Detroit; Paul R. Zink, Farmington, both of Mich.

[73] Assignee: Inspection Engineering and Equipment, Inc., Batavia Royal Oak, Mich.

[22] Filed: Jan. 4, 1971

[21] Appl. No.: 103,593

[52] U.S. Cl. ..........................33/174 L, 33/169 B, 33/172 E
[51] Int. Cl. ......................................G01b 7/12, G01b 7/14
[58] Field of Search ..............33/143 L, 143 N, 172 E, 174 L

[56] References Cited

UNITED STATES PATENTS

| | | | |
|---|---|---|---|
| 3,557,462 | 1/1971 | Kiewicz | 33/174 L |
| 3,108,380 | 10/1963 | Arnaud | 33/174 R |

*Primary Examiner*—Leonard Forman
*Assistant Examiner*—Paul G. Foldes
*Attorney*—Benjamin W. Colman

[57] ABSTRACT

A gaging device for automatically signalling the presence of dimensions in a work piece removably placed in the device for gaging, wherein gaging heads are positioned at one or more sites of the device for contact with the work piece. Pneumatic or hydraulic means are associatedly conjoined to the gaging head for rapid and automatic advance of an indicator pin which touches the work piece at a pre-determined position to signal an undersize, within tolerance, or oversize dimension through an electronic circuit system to a visual signal. The pneumatic or hydraulic means for advancing the gage head indicator pin to the work piece also includes means for retracting the indicator pin. The latter is normally and initially positioned in retracted attitude when the work piece is placed in the gaging fixture. After the measurement has been made, the gage head indicator pin is automatically retracted to permit facile removal of the work piece from the fixture.

11 Claims, 4 Drawing Figures

PATENTED JUN 20 1972

INVENTORS
FRANK M. KIEWICZ &
PAUL R. ZINK

BY *[signature]*

ATTORNEY

INVENTORS
FRANK M. KIEWICZ &
PAUL R. ZINK

BY

ATTORNEY

GAGING DEVICE

The invention involves a gaging device for use in a gaging fixture securing a gage head and motive means conjoined to the gage head. The gaging head is supported by the motive means, the indicator pin of the gage head being advanced through a motion cylinder into the area where the work piece is positioned for gaging. The gage head is of an electronic signalling switch-type having an indicator pin reciprocating stroke permitting free positioning of the work piece in the fixture out of initial contact or interference with the indicator pin.

The motion cylinder is preferably of the pneumatic type, but may alternatively be hydraulically operated. The piston of the cylinder is driven in a single direction, namely forwardly, to advance the indicator pin to a gaging position from a retracted position to which it is biased by a mechanical spring, disposed in the cylinder, when the applied air pressure is relieved. One form of the gaging device of this invention provides for forward travel of the indicator pin of from about 1 to about 1⅛ inches. The gage head forming a part and component of this gaging device invention is more fully described in our co-pending application filed simultaneously herewith, bearing Ser. No. 103,592 and filed of even date.

An object of the invention is to provide a gaging device having one or more electronic signalling gaging heads secured in the device for gaging one or more dimensions of a work piece. Another object is to provide a gaging head connected to and having an indicator pin extending through a pneumatically or hydraulically operated motion cylinder for controlled advance and retraction of the indicator pin into and out of gaging relationship with a work piece. A further object is to provide in such gaging device means for normally maintaining the indicator pin of the gaging head in retracted position before and after introduction of the work piece to the device for the gaging operation. Still another object is to provide pneumatic or hydraulic motion advance means for bringing the indicator pin of the gaging head into gaging contact with the work piece at pre-determined positions, whereby the dimensional character of the work piece at each such position is electronically signalled. Yet a further object is the provision of a gaging device producing rapid comprehensive dimensional information about the work piece for one or a plurality of positions.

Various further and more specific objects, features and advantages of the invention will appear from the description given below, taken in connection with the accompanying drawings, illustrating by way of example preferred forms of the invention. Reference is made here to the drawings annexed hereto and forming an integral part of this specification, in which FIG. 1 is a perspective view of a gaging device embodying the inventive construction.

Figure 1:
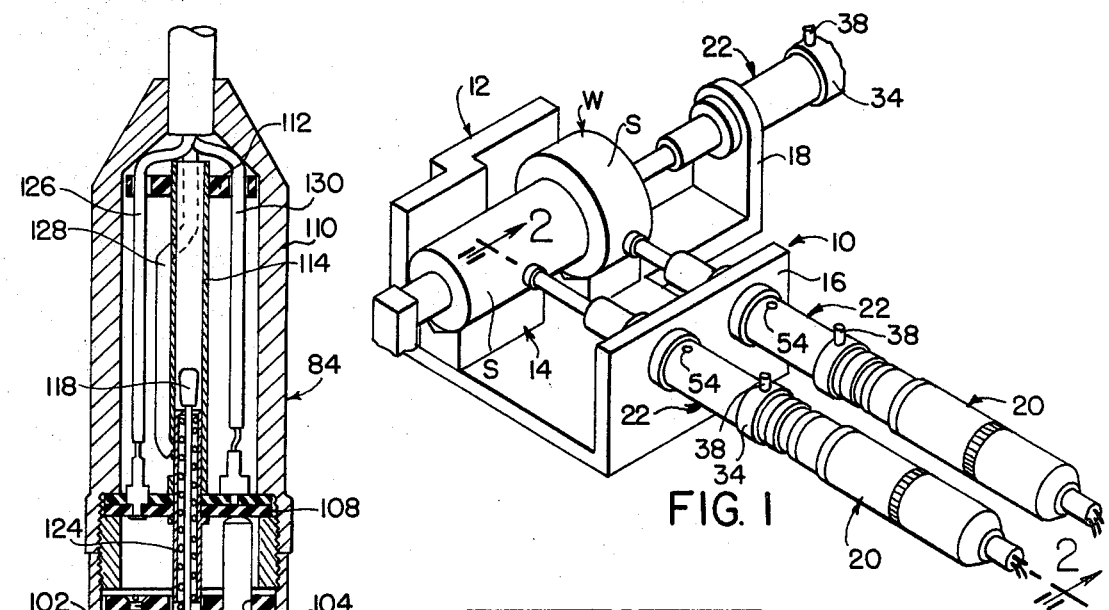

The gaging device 10 comprises a work piece supporting fixture 12 having a V-block rest 14 upon which the work piece W can be placed for gaging, and support means 16 and 18 on which the gaging heads 20 and the coupled conjoined motor devices 22 can be mounted.

It will of course be clearly understood by persons skilled in the art that the fixture 12 can be arranged or modified to accommodate and support one or more gaging heads 20 and motor devices 22, the combination of the coupled gaging head and motor device constituting a single gaging unit. These units can be arranged to gage a single diameter or other dimension or a plurality of such dimensions of the work piece, simultaneously.

The gaging head 20 is specifically disclosed in our co-pending application bearing Ser. No. 103,592 filed simultaneously herewith on Jan. 4, 1971.

The motor drive device 22 is mounted upon either the member 16 or 18 (FIG. 1), as required, for gaging a dimension of the work piece W. One form for such mounting is more particularly illustrated in FIG. 2 wherein an externally threaded hub section 24 is passed through the opening 26 with locking nuts 28 and 30 threaded onto hub section 24 on each side of the support member 16 to secure the motor device in a fixed manner.

The motor drive device 22 comprises the cylinder body 32 having a hub section 24 at the distal end thereof, a bore 33 through the hub section, a cap 34 threadedly secured to the cylinder at its proximal end, an inlet opening 36 for a fluid conduit 38 to pass a suitable fluid such as air or a hydraulic liquid to the bore 40 of the cylinder body 32, a piston 42 having a sealing ring 44 disposed at an exterior annular groove 46 of the piston, and a biasing spring 48 bearing at one end against the piston and at its other end against the counterbore seat 50 adjacent the hub section 24. The hub section is further provided with a bearing seal 52 adjacent the distal end of the hub section 24. The conduit 38 is adapted to be connected to and communicate with a suitable source of fluid under pressure to drive the piston 42 against the bias of the spring 48.

The cylinder body 32 is provided with an air discharge port 54 to permit free discharge of air to the atmosphere from within the cylinder forward of the piston 42.

Figure 4:
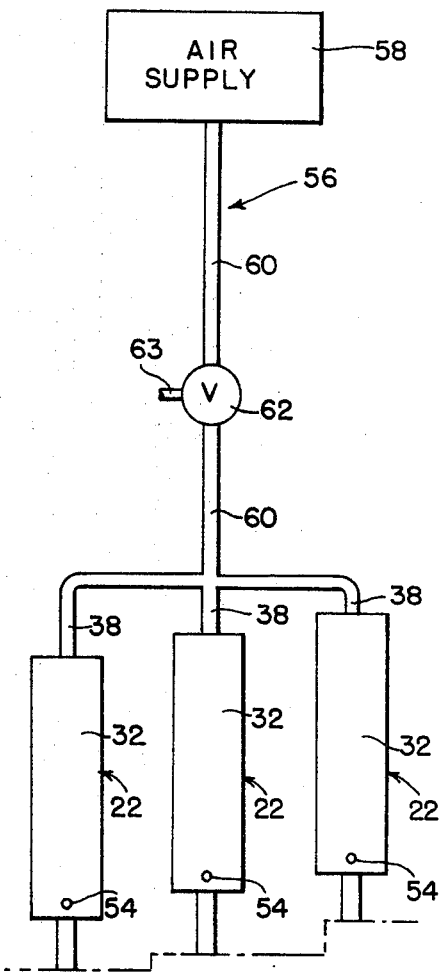
FIG. 4 is a diagrammatic view of a preferred pneumatic system for controlling the advance of the gaging head indicator pin.

The fluid system 56, a preferred form of which is illustrated in FIG. 4, is primarily a pneumatic system having a source of air under pressure 58 produced by suitable air compressing means and a surge tank communicating with one or more motor drive units 22 by a conduit 60 through a manually-operated or solenoid-operated valve 62 with conduits 60 branching off to each of the motor drive devices 22.

The improved gaging head 20, more specifically described in our co-pending application Ser. No. 103,592 filed of even date, comprises an indicator point 64 secured to the distal end of an indicator stem 66 slidingly mounted in the bore 68 of the indicator stem barrel 70 having a bearing 72 at the distal end thereof, a longitudinally extending indicator stem return spring 74 movably disposed in the bore 68 and having one end thereof bearing upon the indicator stem 66 at its shoulder 75, an externally threaded counterbored adjusting barrel 76 fixedly secured to the barrel 70 and having its proximal end fully seated in the counterbore 78, an adjusting nut 80 threadedly mounted on the adjusting barrel 76 to secure the gaging head 20 in positive dimensional relationship with the motor drive device 22, the counterbored adjusting ring assembly 82 also being threadedly secured to the adjusting barrel 76, and a cap assembly 84.

The indicating stem barrel 70 is disposed through the bore 86 of the cap 34 which is provided with a fluid sealing gland or ring 88 to seal the barrel against escape of fluid from the bore 40. The indicator stem 66 is provided with a reduced proximal hub section 90 fixedly secured to a metallic contact plate 92 which is slidingly disposed in the counterbored adjusting ring body 93. The diameter of the indicator stem hub end 90 is reduced sufficiently to allow for the compression spring 74 to expand and contract without binding in the bore 68 of the barrel 70.

Figure 2:
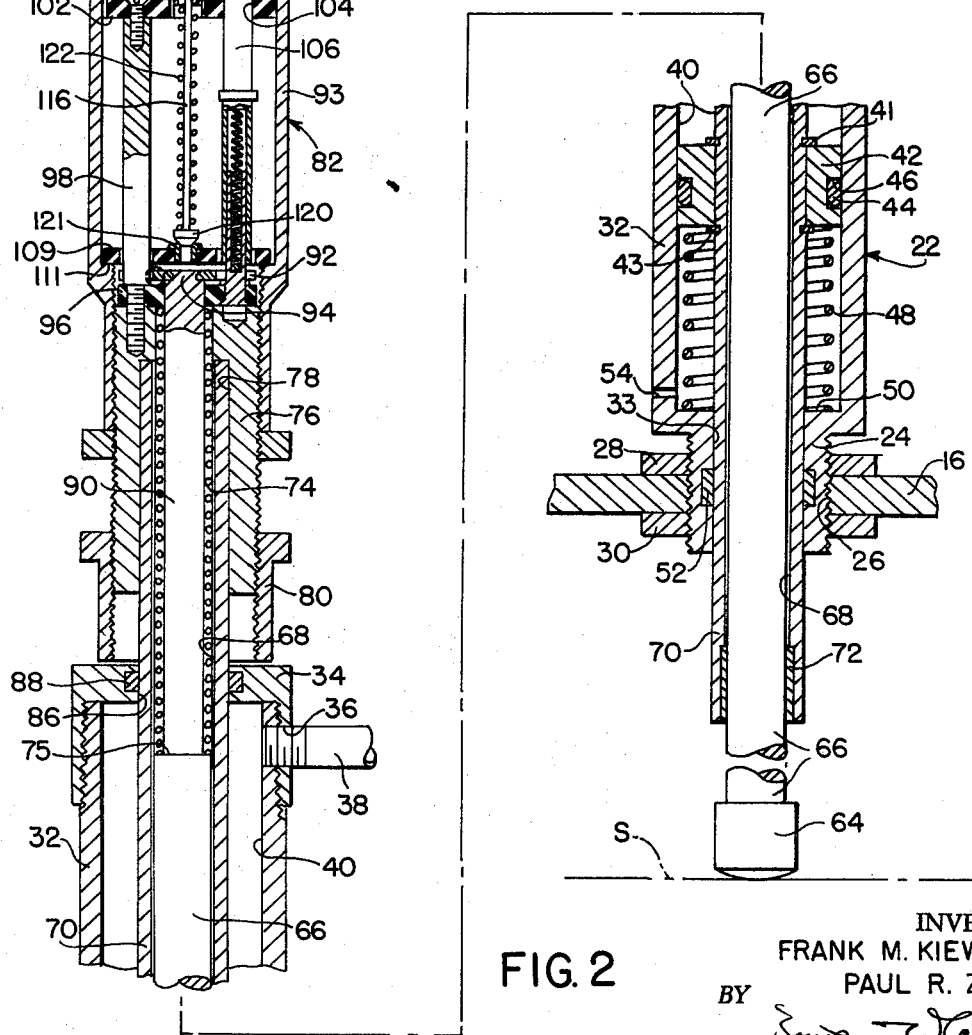
FIG. 2 is a longitudinally extending vertical section taken substantially on the line 2—2 of FIG. 1, showing the indicator pin in work piece gaging position.

The movable contact plate 92 is secured to the distal end of the indicator stem hub section 90 by the peened over member 94. An insulating lower contact plate 96 is fixedly secured to the proximal end of the adjusting barrel 76 by a pair of guide posts 98,98, one of which is illustrated in FIG. 2. Posts 98 serve as guides for the movable metallic contact plate 92 as it moves within the counterbored adjusting ring body 93. Affixed to the distal ends of the posts 98 by screws 100 is the fixed insulating stop plate 102 provided with an opening 104 for passage of the terminal contact member 106 adapted to make electrical contact and connection with the upper contact plate assembly 108.

An upper movable insulated contact plate 109 is slidingly disposed upon and guided by the guide posts 98,98 within the counterbored adjusting ring body 93. The plate 109 is normally at rest upon the adjusting ring body shoulder or counterbore seat 111 and advances toward and away from the metallic contact plate 92 on the proximal end of the indicator stem hub section 90 as the adjusting ring body 93 is threaded upon the adjusting barrel 76. The contact plate 109 is normally out of contact with the metallic contact plate 92 when at rest and prior to or following the gaging operation.

The cap assembly 84 comprises a cap body 110, an insulator spacer plate 112 disposed in or adjacent the countersunk end of the cap body, a central tubular member 114 extending through the upper contact plate assembly 108, a central contact pin 116 having its proximal end 118 disposed within the tubular member 114 and its distal end 120 disposed beyond the tube in contact with the contact grommet 121 of the upper movable contact plate 109 under the biasing effect of the spring 122, one end of which bears against the headed pin end 120 and the other end of which bears against an end of the tubular fitting 124 secured telescopically within and fixedly to the central tubular member 114. Three conductors, 126, 128 and 130, are connected to the contact plate assembly 108 and to the central tubular member 114, as illustrated in FIG. 2. The electrical conductive functions of these three conductors is more fully disclosed and described in our co-pending application Ser. No. 103,592 filed of even date. Such functions do not in any way modify or qualify the structural invention disclosed and claimed in this application.

In operation, the gaging device 10 of this invention functions as follows. Under the biasing effect of the coil spring 48 in the motor cylinder 32, the piston 42, which is slidable in the bore 31 of the cylinder 32 and is fixedly secured to and about the barrel 70 within which the indicator stem 66 is disposed, retracts the indicator stem and pin 64 to a position which is substantially remote from the surface S of the work piece W when placed in position upon the V-block rest 14 of the supporting fixture 12. Being so retracted, the space leading to and occupied by the work piece W is open and free for insertion and removal of a work piece W upon the rest 14.

Once the work piece is placed in position, the motor device 22 is actuated to advance the indicator point 64 to the work piece surface S. This is done by operating the valve 62, either manually or automatically, to admit fluid under pressure from the source 58 through conduit 60 to the inlet conduits 38 communicating with the bore 40 of the cylinder 32. When fluid is so admitted, it bears under pressure against the piston 42 overcoming the biasing effect of the spring 48 and advancing the barrel 70 through the cap bore 86 until the adjusting nut 80 comes to rest against the exterior end surface of the cap 34. The indicator stem and point having been pre-adjusted to gaging position by the adjusting barrel 76 to which the adjusting nut 80 is secured and within the threaded bore of the adjusting ring 82, the indicator point 64 is in position for moving the contact plate 92 away from the lower contact plate 96 and toward the upper contact plate 109 as the surface dimension indicates.

Figure 3:
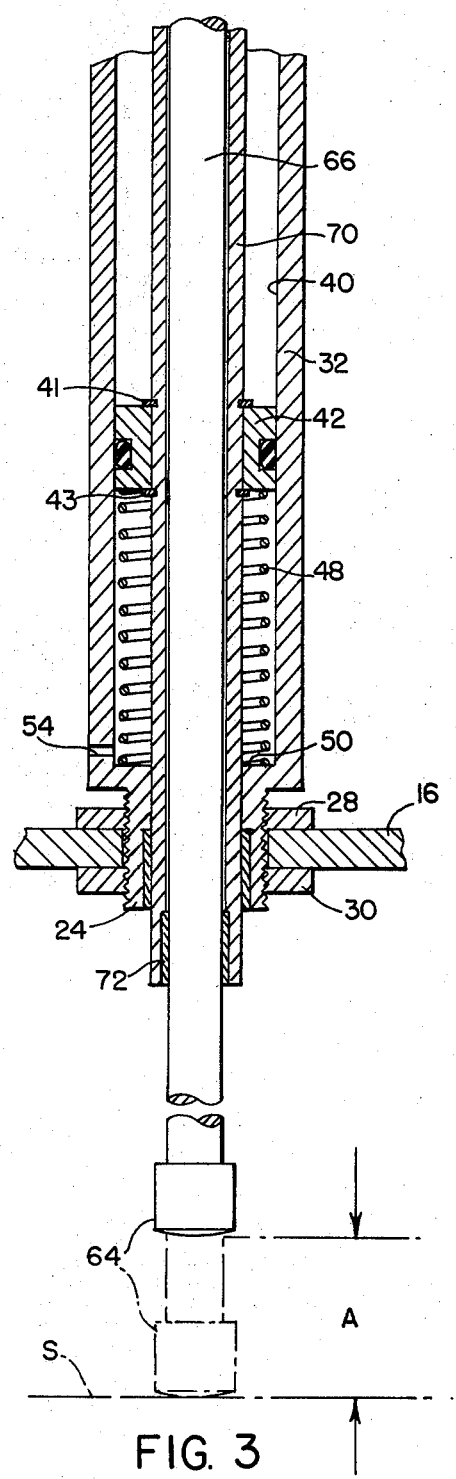
FIG. 3 is a fragmentary longitudinal section similar to that shown in FIG. 2, with the indicator pin retracted from its gaging position.

When the gaging signal is generated by the position of the movable metallic contact plate 92 through the circuitry more fully described and disclosed in our co-pending application Ser. No. 103,592, filed of even date, the signal result is observed and/or recorded. Thereafter, the valve 62 is closed against the further admission of air or other fluid under pressure to the cylinder bore 40, releasing the air within the cylinder to escape to the atmosphere through the valve opening 63 under the biasing pressure of the coil spring 48 as it bears against the piston 42 and returns it to the retracted position illustrated in FIG. 3. When fluid pressure is applied to the piston 42, driving the barrel 70 forward toward the work piece surface S, the air in the bore 40 forward of the piston is discharged through the port 54. When piston 42 is returned to retracted position in the bore 40, air is admitted to the bore through the port 54.

Several gaging position adjustments are provided in the gaging head 20, including the threaded adjustment of the hub section 24 in the fixture support member 16 secured by the adjusting or lock nuts 28 and 30, the threaded adjustment of the stop nut 80 on the body of the adjusting barrel 76 so as to limit the forward advance of the barrel 70 to a predetermined stop position against the proximal end of the cylinder 32 at its cap 34. These adjustments in and with the motor device 22, together with the adjustments provided by the counterbored adjusting ring 82 and barrel 76, provide the several means for controlling the gaging signalling of the indicator point 64 through the electrical switching elements embodied within the adjusting ring 82 and the cap assembly 84.

Although a certain particular embodiment of the invention is hereindisclosed for purposes of explanation, further modifications thereof, after study of this specification, will become apparent to those skilled in the art to which the invention pertains. Reference should be had to the appended claims in determining the scope of the invention.

We claim:

1. In a gaging device for a fixture-type gaging system designed to gage a dimension of a workpiece requiring substantial retraction of the gage point in the gaging area for workpiece admission to and withdrawal from the gaging fixture and for rapid advance and retraction of the gage point, the combination comprising
   a gaging fixture,
   a gaging head for said fixture having
      an adjusting barrel,
      an indicator stem barrel fixedly secured to and extending from the distal end of said adjusting barrel,
      an indicator stem slidingly movable within said barrel and having an indicator point at its distal end disposed outboard of said indicator stem barrel,
   drive means mounted upon said indicator stem barrel to support said gaging head and adjustably secured to said gaging fixture,
   said drive means adapted to drive said indicator stem barrel and indicator point toward said workpiece, means adjustably secured to said gaging head for limiting the advance of said indicator stem barrel toward said workpiece,
   resilient means for biasing said indicator stem barrel and point away from said workpiece,
   said drive means being operative against said resilient means,
   and means to control actuation of said drive means.

2. The gaging device combination defined in claim 1, wherein
   said indicator stem barrel drive means comprises
      a fluid cylinder,
      and a fluid actuated piston within said cylinder,
         said piston being operatively secured to said indicator stem barrel.

3. The gaging device combination defined in claim 2, wherein
   said indicator stem barrel drive means comprises
      an air cylinder,
      and an air actuated piston, within said cylinder, secured to said indicator stem barrel.

4. The gaging device combination defined in claim 1, wherein
   said advance limiting means comprises an adjusting nut threadedly secured to said adjusting barrel rearwardly of the distal portion of said indicator stem barrel drive means.

5. The gaging device combination defined in claim 1, wherein
   said resilient biasing means is disposed within said indicator stem barrel drive means.

6. The gaging device combination defined in claim 2, wherein
   said control means comprises a manually operable valve.

7. The gaging device combination defined in claim 3, wherein
said control means comprises a manually operable air valve.

8. The gaging device combination defined in claim 1, wherein
said gaging head further comprises
an elongated adjusting ring adjustably secured at one end to said adjusting barrel,
a cap removably secured to the other end of said adjusting ring,
and an electrical switch responsive to said indicator point contained within said adjusting ring and said cap.

9. The gaging device combination defined in claim 8, wherein
said electrical switch comprises
a first fixed contact plate secured to the proximal end of said adjusting barrel within said adjusting ring, a second contact plate axially movable in said adjusting ring and spaced apart from said first contact plate, and movable switch contact means secured to the proximal end of said indicator stem, intermediate said first and second contact plates, and spaced from said second contact plate in its at-rest position.

10. The gaging device combination in claim 8, wherein
said electrical switch comprises
a first fixed contact plate, a second movable contact plate, and movable switch contact means secured to the proximal end of said indicator stem and intermediate said first and second contact plates,
stop means in said elongated adjusting ring adjacent the proximal end thereof for limiting the axial travel of said second movable contact plate and said movable switch contact means within said adjusting ring.

11. The gaging device combination defined in claim 10, wherein
said indicator point is disposed outboard from the distal end of said indicator stem barrel a distance substantially equal to or greater than the maximum travel distance of said second contact plate within said adjusting ring, when said gaging head is fixture supported in dimension gaging attitude.

* * * * *